United States Patent [19]

Shimanovich et al.

[11] 4,439,657

[45] Mar. 27, 1984

[54] APPARATUS FOR HIGH TEMPERATURE TREATMENT OF RECTILINEAR-GENERATRIX SURFACES OF NONCONDUCTIVE PRODUCTS

[75] Inventors: Vladimir D. Shimanovich; Andrei K. Shipai, both of Minsk; Vladimir G. Davydenko, Mogilev; Leonid I. Kiselevsky, Minsk; Sergei G. Korotkevich, Minsk; Nelli I. Lipnitskaya, Minsk; Vyacheslav P. Machnev, Minsk; Anatoly I. Zolotovsky, Minsk; Vladislav G. Moskovsky, Minsk; Nikolai N. Naumenko, Minsk, all of U.S.S.R.

[73] Assignee: Institut Fiziki Akademii Nauk Belorusskoi SSR, Minsk, U.S.S.R.

[21] Appl. No.: 62,180

[22] Filed: Jul. 30, 1979

[51] Int. Cl.³ .............................................. B23K 9/00
[52] U.S. Cl. ........................ 219/121 PR; 219/121 P; 219/123; 219/121 PA; 264/64; 264/80; 425/445; 125/1
[58] Field of Search ...... 219/121 P, 121 PR, 121 PA, 219/123, 121 PY; 13/2; 125/1, 25, 35; 250/539, 533; 264/56, 64, 80; 425/404, 445; 373/18, 22

[56] References Cited

U.S. PATENT DOCUMENTS

| | | | |
|---|---|---|---|
| 2,655,909 | 10/1953 | Aitchison et al. | 125/1 |
| 3,165,564 | 1/1965 | Howle et al. | 264/80 |
| 3,265,056 | 8/1966 | Pieper et al. | 125/35 X |
| 3,584,184 | 6/1971 | Tylko | 219/121 P X |
| 3,596,047 | 7/1971 | Maniero | 219/121 P X |
| 3,891,828 | 6/1975 | De Corso | 219/123 |
| 3,940,653 | 2/1976 | Schnell et al. | 219/121 P |
| 3,944,778 | 3/1976 | Bykhovsky et al. | 219/121 PR |
| 4,242,562 | 12/1980 | Karinsky et al. | 219/123 |

Primary Examiner—M. H. Paschall
Attorney, Agent, or Firm—Lilling & Greenspan

[57] ABSTRACT

Disclosed is an apparatus for high temperature treatment of rectilinear-generatrix surfaces of nonconductive products. The apparatus comprises an anode arranged opposite to a cathode to provide an arc gap therebetween for striking an arc discharge. The apparatus is further provided with a product feeding device to move the product a desired distance from the axis of the arc. The cathode is held securely in place, while the anode is positioned, integrally with the fixed cathode, to maintain a fixed position of the arc axis within the arc gap exceeding the length of the generatrix of the surface being treated. The feeding device is designed so as to provide the movement of the products in a plane extending normally to the axis of the arc when the generatrix of the surface being treated is parallel to the axis of the arc.

14 Claims, 6 Drawing Figures

APPARATUS FOR HIGH TEMPERATURE TREATMENT OF RECTILINEAR-GENERATRIX SURFACES OF NONCONDUCTIVE PRODUCTS

FIELD OF THE INVENTION

The present invention relates to the art of high temperature surface treatment of products made from nonconductive materials, in particular, from artificial stone materials, such as ceramics, silicate, concrete. More particularly, the invention relates to apparatus for high temperature treatment of rectilinear-generatrix surfaces of nonconductive products, e.g. for treating flat, cylindrical, tapered and the like surfaces.

The invention can most advantageously be used for surface fusion of building products made from artificial stone materials to provide a fused layer having a glazed structure and exhibiting protective and decorative properties.

DESCRIPTION OF THE PRIOR ART

Known in the prior art is a high temperature surface treatment apparatus adapted for treating products made from nonconductive materials (cf. USSR Inventor's Certificate No. 172,663), which apparatus comprises an oxyacetylene burner used as a high temperature source and a burner transfer device adapted for relative movement of the burner and the product being treated at a desired distance between the product surface and the burner nozzle. During the treating process, the burner flame is substantially directed at right angles to the surface being treated, and, therefore, the effective heat transfer occurs within the limits of the flame spot on the product surface. Moreover, the burner is arranged to move to and fro over the surface to be treated, resulting in the surface layer thus treated possessing heterogeneous properties in a transverse direction with respect to the path of movement of the burner, which in turn results in visible boundaries between the treated paths, i.e. in a so called "stripped" structure of the surface layer. Moreover, said apparatus suffers from poor efficiency due to a small area of heat contact between the flame and the surface and due to a relatively low temperature of the oxyacetylene flame.

There is also known a high temperature surface treatment apparatus (cf. U.S. Pat. No. 3,584,184) wherein a plasma generation device is used for effecting a surface treatment of products made from nonconductive materials and having rectilinear-generatrix surfaces. The plasma generator comprises an anode arranged opposite to a cathode to provide an arc gap therebetween for striking an arc discharge. The apparatus is further provided with a product transfer device enabling the product to be moved at a desired distance from the arc axis. The anode is shaped like an elongated box held securely in place and extending along the whole length of the generatrix of the surface to be treated, while the cathode is operatively associated with a cathode transfer device providing reciprocating movement of the cathode along the length of the anode. In this apparatus, the arc is excited in a transverse plane with respect to the surface generatrix and is caused to be moved point by point along the surface generatrix. The use of the plasma treatment and the provision of an increased area of heat contact of the plasma arc with the surface makes it possible to increase the efficiency of said high temperature surface treatment apparatus, as compared to the known apparatus provided with the oxyacetylene burner.

However, the apparatus in question fails to eliminate the "stripped" structure of the fused surface, resulting from the fact that, during the treating process, the cathode is caused to be moved repeatedly to and fro over the surface. As a result, said apparatus fails to provide a smooth fused surface and a homogeneous structure of the fused layer.

SUMMARY OF THE INVENTION

It is an object of the present invention to provide an apparatus for high temperature treatment of rectilinear-generatrix surfaces of nonconductive products, ensuring the production of smooth fused surfaces and the homogeneous structure of the fused surface layer.

Another object of the present invention is to increase the productivity and efficiency of the apparatus for high temperature treatment of rectilinear-generatrix surfaces of nonconductive products.

With these and other objects in view, there is proposed an apparatus for high temperature treatment of rectilinear-generatrix surfaces of nonconductive products, comprising an anode of a plasma generator arranged opposite to its cathode to provide an arc gap therebetween, and a product feeding device adapted to move the product a desired distance from the axis of the arc. According to the invention, the cathode is mounted in a fixed position, while the anode is positioned, integrally with the fixed cathode, to maintain a fixed position of the arc axis within the arc gap exceeding the length of the generatrix of the surface being treated. The feeding device is designed so as to provide movement of the products in a plane extending normally to the axis of the arc when the generatrix of the surface being treated is parallel to the axis of the arc.

The proposed apparatus ensures high temperature treatment of the whole surface of the product as the product is continuously moved in one direction, and eliminates the reciprocating movement of the high temperature source with respect to the surface being treated. As a result, a smooth fused surface is produced having a homogeneous structure of the fused layer. Moreover, the high temperature surface treatment of the product moving continuously in one direction and the possibility of eliminating the reciprocating movement of the high temperature source with respect to the surface being treated increases the efficiency of the proposed apparatus.

In one embodiment, the anode takes the form of a hollow rod coaxially arranged with the cathode, the anode interior cavity communicating with a suction device, e.g. with a fan. In doing so, the plasma contact spot on the anode is located within the anode, thus enabling the outer surface of the anode to be freely cooled. As a result, the possibility exists of using low-melting materials for the anode, such as copper.

In order to prevent the plasma jet shorting against the outer surface of the anode shaped like a hollow rod, it is advisable that the end face of the anode should be provided with a water-cooled flat screen electrically insulated from the anode and having a central opening equal to and coaxial with the hollow opening provided in the anode.

In another embodiment, the anode coaxially arranged with the cathode is shaped like a pin blown over by a working gas flowing towards the cathode. In this case, it is impossible to provide the effective cooling of the anode, which results in the necessity of using the anodes made of refractory materials, such as wolfram. However, the use of the counter flow of gas passing around the electrodes of the plasma generator results in an increased concentration of energy of the plasma jet and upgrades the apparatus efficiency.

In still another embodiment, the anode is formed by two parallel cylinders rotated in opposition and having their axes extending normally to the axis of the arc, the gap provided therebetween being smaller than the diameter of the plasma contact spot on the anode. Such an embodiment of the anode reduces the fluctuation of the plasma parameters and improves the stability of the plasma spatial position.

In order to increase the service life of the anode formed by two cylinders, it is advisable to arrange the cylinders on a movable support connected with a support transfer mechanism used to move the support to and fro along the axes of the cylinders.

It is preferable that the feeding device be designed as two similar conveyers arranged symmetrically about the arc axes. This enables the apparatus productivity to be doubled and upgrades the efficiency thereof due to a more effective use of the plasma energy, i.e. due to the confinement of the plasma and multiple reflection of the plasma jet from the product surfaces being treated.

In order to increase the efficiency of the apparatus with unilateral arrangement of the feeding device with respect to the arc axis, it is desirable that a water-cooled screen electrically insulated from the anode and cathode be mounted on the opposite side of the arc axis.

BRIEF DESCRIPTION OF THE INVENTION

The foregoing and other objects and advantages of the invention will be better understood from the following description taken in conjunction with the accompanying drawings illustrating preferred embodiments of the invention, wherein.

DETAILED DESCRIPTION OF THE INVENTION

Figure 1:
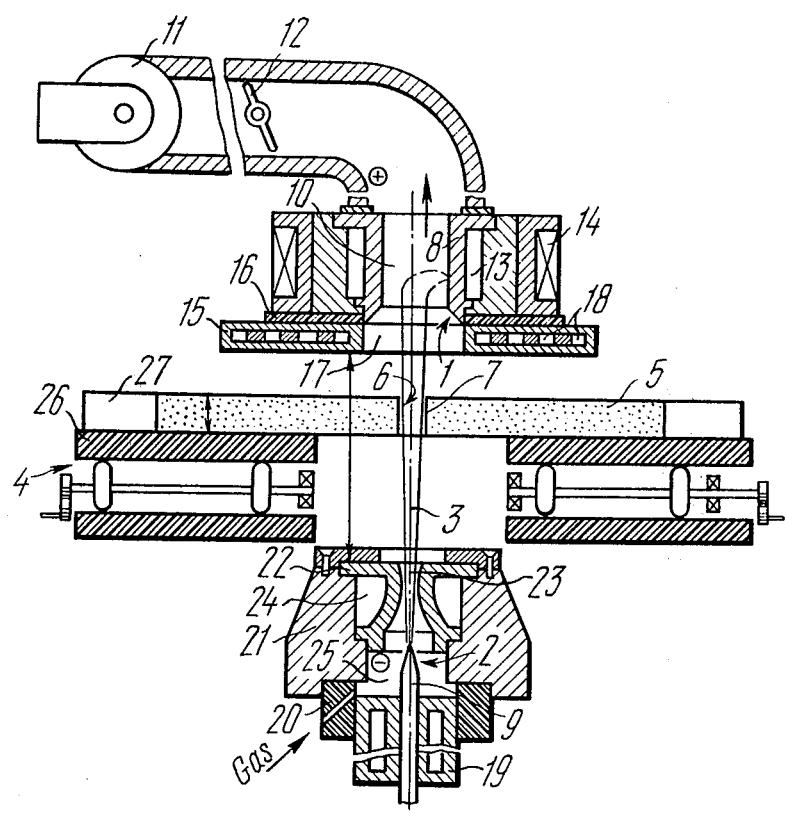
FIG. 1 is a longitudinal sectional view taken along the axis of the plasma generator arc and illustrating an apparatus, according to the invention, adapted for high temperature surface treatment of a brick.

Referring now to the accompanying drawings and initially to FIG. 1, the proposed apparatus for high temperature surface treatment of bricks is adapted to form a fused surface layer on a brick, exhibiting protective and decorative properties.

The apparatus comprises a plasma generator (not shown) having an anode 1 arranged opposite to its cathode 2 so as to provide an arc gap H therebetween, wherein an arc having a rectilinear axis 3 is initiated.

The apparatus is further provided with a feeding device 4 adapted to move products 5 at a desired distance from the arc axis 3, the product surfaces 6 being formed by a rectilinear generatrix 7.

The arc gap H provided between the anode 1 and the cathode 2 exceeds the length of the generatrix 7 of the brick surface 6 being treated. The cathode 2 is held securely in place, while the anode is designed to maintain a fixed position of the arc axis 3.

The anode 1 is made as a hollow copper rod 8 coaxially arranged in a vertical plane with the cathode 2 made as a wolfram pin 9.

An interior cavity 10 of the anode rod 8 is in communication with a suction device 11, e.g. with a fan. A governor valve 12 is disposed in the passage connecting the interior cavity 10 with the fan 11. Formed around the lower portion of the anode rod 8 is a circular cavity 13 communicating with a coolant circulation system (not shown).

A solenoid 14 is concentrically arranged with the circular cavity 13 to produce a rotating magnetic field with its center extending around the axis of the anode 1. Attached to the lower end face of the anode rod 8 is a flat screen 15 electrically insulated therefrom by means of an insulating spacer 16. A central opening 17 provided in the screen 15 is equal to and coaxial with the opening of the interior cavity 10 of the anode rod 8. The screen 15 has passages 18 which are in communication with the coolant circulation system (not shown).

A chuck collet 19 serves to secure the cathode pin 9 in a sleeve 20 made of dielectric material and pressed into a housing 21. A nozzle 22 is arranged in the upper portion of the housing 21 and disposed around the top of the cathode pin 9, which nozzle is provided with a central opening 23 used to stabilize and confine the plasma jet. Formed between the nozzle 22 and the inner surface of the housing 21 is a circular cavity 24 communicating with the coolant circulation system (not shown). Between the nozzle 22 and the pin 9 there is formed a cavity 25 which is in communication with a source (not shown) of working gas, such as nitrogen.

The feeding device 4 is designed as two rectilinear conveyers 26 adapted to move the bricks 5 in a plane extending normally to the axis 3 of the arc, when the generatrix 7 of the surface 6 being treated is disposed parallel to the arc axis 3. The conveyors 26 are mounted symmetrically about the arc axis 3 and provided with rectilinear projections 27 arranged to fix the position of the bricks 5 placed on said conveyers, the projections 27 being arranged along the axes of the conveyers 26 and symmetrically about the axis 3 of the arc.

The proposed apparatus described hereinabove operates as follows.

D-c voltage is applied to the anode 1 and the cathode 2. In operation, the stream of coolant circulates through the cavities 13 and 24 and the passages 18 for cooling the anode 1, the cathode 2 and the screen 15. The working gas is fed into the cavity 25 and the exhaust fan 11 is then energized to suck the gas out of the interior cavity 10 of the hollow rod 8, whereupon the arc is initiated, the straightness and stability of the arc being provided by controlling the gas consumption. The governor valve 12 is used to control the amount of gas sucked out of the interior cavity 10 of the hollow rod 8, thus providing a required position of the anode spot in the axial direction.

On attaining steady operating conditions of the apparatus, the conveyers 26 are switched on, the bricks 5 being placed on the conveyers 26 so that the surfaces 6 to be treated are facing each other. The bricks 5 are butted up against the projections 27 to provide a fixed position at which the generatrices 7 of the brick surfaces 6 are symmetric about the arc axis 3 and parallel therewith. The magnetic field produced by the solenoid 14 enables the arc contact spot to be moved around the inner periphery of the cavity 10 of the anode rod 8. The flow of gas sucked out of the interior cavity 10 provides the displacement of the arc contact spot in the axial direction. The screen 15 serves to prevent the arc shorting against the solenoid 14 and other elements of the anode 1 and provides additional stabilization of the arc formed in the arc gap between the anode 1 and the cathode 2.

The conveyers 26 cause the bricks 5 to move continuously and in the area of the contact of the surface 6 to be treated with the plasma jet there takes place an immediate heating of the whole surface 6 along the length of the generatrix 7. Thus, the surface fusion of the bricks 5 is effected in one path of the bricks 5 moving in one direction. As a result, the fused layer has a homogeneous structure and a flat smooth surface, which is of particular importance to decorative surface treatment of building products. The feeding device formed by two conveyers 26 enables a pair of products 5 to be simultaneously treated, thus doubling the productivity of the apparatus. Furthermore, in the proposed apparatus, there is provided the confinement of the plasma jet, which results in its stability and in an increased area of heat contact between the plasma jet and the surface 6 being treated. The multiple reflection of the plasma jet from the product surfaces 6 provides an effective convection-radiative heat transfer. All these factors taken together make it possible to increase the productivity and efficiency of the plasma treatment.

Figure 2:
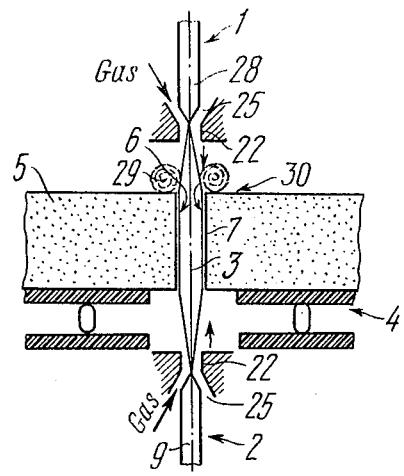
FIG. 2 is a view of a high temperature surface treatment apparatus wherein the anode is shaped like a pin, according to the invention.

In the embodiment shown in FIG. 2, the anode 1 is shaped like a wolfram pin 28, the assembling thereof being similar to that of the cathode pin 9 shown in FIG. 1. Similar elements are designated by the same reference numerals in FIGS. 1 and 2. During the treating process, the working gas is supplied into the cavities 25 of the anode assembly 1 and the cathode assembly 2 for striking an arc discharge therebetween. The arc is confined passing through the nozzles 22 of the anode 1 and the cathode 2 and the arc temperature is 1.5 times higher that the temperature of the arc in the modification shown in FIG. 1. The counter flow of the working gas increases the heat transfer and, as a result, the efficiency of the apparatus as compared to the modification shown in FIG. 1.

Since the arc is exposed to two oppositely directed flows of the working gas, at the point of interaction of said flows there is formed an area 29 of the arc expansion, the diameter of the arc in said area being 2-2.5 times greater than the diameter of the arc outside of said area. Altering the ratio of consumption of the working gas passing through the nozzles 22 of the anode 1 and the cathode 2, it is possible to adjust the position of the area 29 along the arc axis 3. Moreover, the possibility exists of finding such a position of the area 29 at which the area 29 adjoins one of the edges of the surface 6. In this case, in addition to the treatment of the surface 6, the possibility exists of partly fusing a surface 30 crossing the surface 6, the fused area extending 6-10 mm from the intersection of the surfaces 30 and 6. This may prove to be useful for surface fusion of some types of products.

Figure 3:
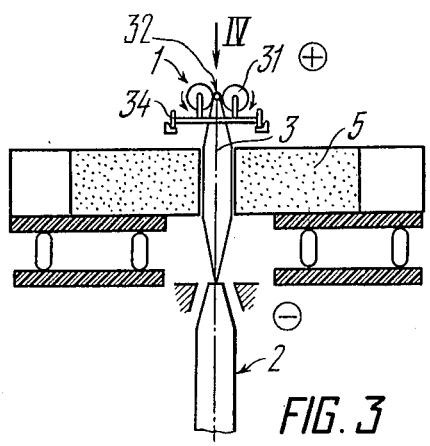
FIG. 3 is a view of a high temperature surface treatment apparatus wherein the anode is formed by two parallel cylinders, according to the invention.
Figure 4:
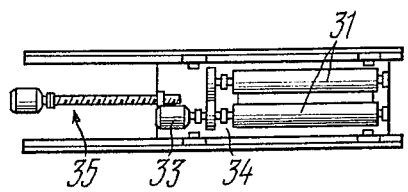
FIG. 4 is a top view taken in the direction of arrow IV of FIG. 3 and illustrating the anode assembly.

In the embodiment shown in FIG. 3, the anode 1 is formed by two parallel cylinders 31 made of copper and arranged to provide therebetween a gap 32 which is smaller in size than the contact arc spot in said cylinders, similar elements being designated by the same reference numerals in FIGS. 1 and 3. The cylinders 31 are mounted to have their axes extending normally to the axis 3 of the arc and are connected with a rotary drive 33 used to rotate said cylinders in opposition, in the gap 32 the tangential component of the peripheral speed of the cylinders 31 being directed away from the cathode 2. The cylinders 31 and the rotary drive 33 are mounted on a movable support 34 (FIG. 4) connected with a support transfer mechanism 35 adapted to move the support 34 to and fro along the axes of the cylinders 31.

The embodiment of the anode 1 shown in FIG. 3 provides a fixed position of the arc axis 3 and enables the arc to be brought in active contact with the surfaces of the cylinders 31 rotated in opposition, thus ensuring increased stability of the spatial position of the arc axis 3 and reducing the fluctuation of the arc parameters as compared to the modification shown in FIGS. 1 and 2. Moreover, the reciprocating movement of the cylinders 31 gives rise to an effective heat distribution and provides minimum and uniform errosion over the whole surface of the cylinders 31.

Figure 5:
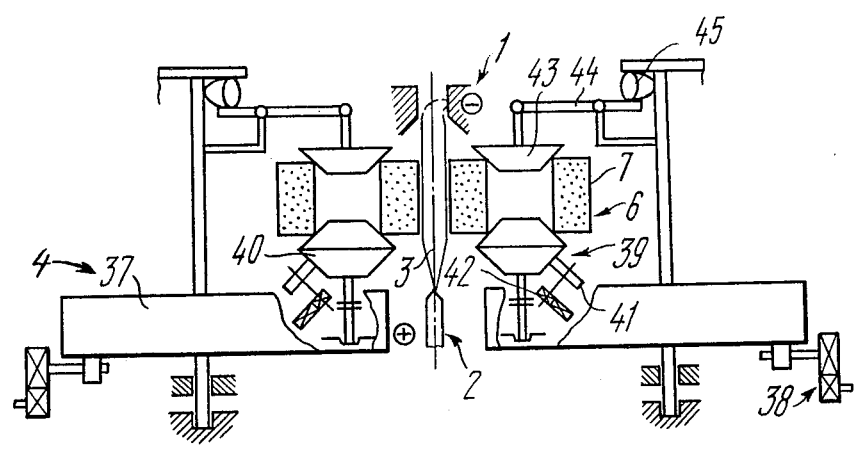
FIG. 5 is a sectional view taken along the axis of the arc and illustrating the apparatus adapted for high temperature surface treatment of cylindrical products.

Shown in FIG. 5 is the apparatus adapted for surface treatment of hollow cylindrical products, the elements shown in FIG. 5 and similar to the elements shown in FIG. 1 being designated by the same reference numerals. In this apparatus, the feeding device 4 is formed by two rotary conveyers 37 arranged symmetrically about the arc axis 3 and rotated in a plane extending normally to said axis. The conveyers 37 are brought into rotation by means of an electric motor (not shown) connected therewith via a reducer 38. Peripherally mounted on the conveyers 37 are mechanisms 39 which are equally spaced and used to position and to rotate the products 5 about their axes so that the generatrix 7 of the surface 6 is parallel with the axis 3 of the arc, the surface 6 being disposed at a required distance from the axis 3.

The mechanism 39 comprises a lower driving cone 40 operatively associated with a rotary drive (not shown) via a friction gear 41 and a reducer 42, and an upper centering cone 43 fitted onto the end portion of a lever 44 in contact with an eccentric or cam 45 connected with a drive (not shown) and adapted for lifting the lever 44 when removing and mounting the products 5.

In operation of the apparatus shown in FIG. 5, the plasma arc is formed in the same manner as hereinbefore described. Then the products 5 are placed on the rotary conveyers 37, the products 5 being mounted on respective lower cones 40 at a maximum distance from the arc axis 3 and then being fixed by the respective upper centering cone 43. Then conveyers 37 are energized to replace the products 5 to be treated and to dispose them at a minimum distance from the arc axis 3, whereupon the drive of the mechanism 39 is energized, the friction gear 41 being used to establish the required speed of the product 5 to be treated. The surface 6 is subjected to high temperature treatment during one complete revolution of the product 5. Coincidentally with the treating process, a new pair of the products 5 to be treated is placed on the conveyers 37. Upon completion of the treatment of one pair of the products 5, the drive of the mechanism 39 is shut down, while the drive of the conveyers 37 is energized to move a new pair of products 5 and to dispose them at a minimum distance from the axis 3 of the arc.

Figure 6:
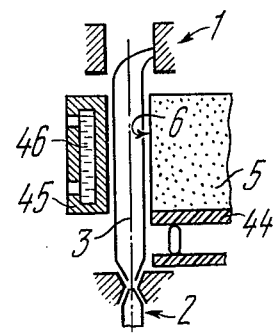
FIG. 6 is a view of a high temperature surface treatment apparatus with unilateral arrangement of the feeding device, according to the invention.

In the embodiment shown in FIG. 6, the feeding device 4 is designed as a single conveyer 44 used to transfer the products 5 on one side about the arc axis 3, the elements similar to the elements shown in FIG. 1 being designated by the same reference numerals. Mounted on the opposite side about the axis 3 is a screen 45 provided with passages 46 in communication with the coolant circulation system (not shown). The screen 45 is electrically insulated from the electrodes of the plasma generator and arranged along the axis 3 of the arc and at a distance therefrom equal to 0.2–0.3 diameter of the arc. In operation, the screen 45 serves to provide contact of the plasma arc with the surface 6 and ensures multiple reflection of the arc, thus enabling the heat of the arc to be more effectively used when treating the products 5 moving along one side about the arc axis 3.

While particular embodiments of the invention have been shown and described, various modifications thereof will be apparent to those skilled in the art. Thus, the construction of the feeding device may be different from that described above, for example, for treating flat products the feeding device may be formed as a carriage connected with a carriage transfer mechanism adapted for reciprocating movement of the carriage and having a rapid return stroke. When treating cylindrical products, the feeding device may be formed as a rectilinear conveyer with a means for positioning and rotating the product being treated. It is allowable to arrange the anode and cathode so as to extend the axis of the arc in a horizontal plane. There are also possible various other modifications of the anode and cathode assemblies. Therefore, various modifications may be made in the invention without departing from the spirit and scope of the following claims.

What is claimed is:

1. An apparatus for high temperature treatment of rectilinear-generatrix surfaces of nonconductive products, comprising a plasma generator having an anode arranged opposite to a cathode to create therebetween an arc gap exceeding the length of a generatrix of the surface being treated, said cathode being mounted in a fixed position, and said anode being mounted integrally with said cathode to maintain a fixed position of the arc axis within said arc gap; and a product feeding device to move said product a desired distance from the arc axis in a plane extending normally to the arc axis when the generatrix of the surface being treated is parallel to the arc axis; means for moving an arc contact spot over the surface of said anode; means for displacing said arc contact spot along the arc axis; wherein said anode includes a hollow rod having an interior cavity in communication with a suction device; a water-cooled screen attached to the end face of said anode and electrically insulated from said anode, said screen having a central opening which is equal to and coaxial with an opening of said interior cavity of said anode.

2. An apparatus as claimed in claim 1, wherein said feeding device includes two similar conveyers arranged symmetrically about said arc axis.

3. An apparatus as claimed in claim 1, wherein said feeding device is disposed on a first side of the arc axis; and further comprising a water-cooled screen electrically insulated from said anode and cathode and disposed on a second side of said arc axis.

4. An apparatus for high temperature treatment of rectilinear-generatrix surfaces of nonconductive products, comprising a plasma generator having an anode arranged opposite to a cathode to create therebetween an arc gap exceeding the length of a generatrix of the surface being treated, said cathode being mounted in a fixed position, and said anode being mounted integrally with said cathode to maintain a fixed position of the arc axis within said arc gap; and a product feeding device to move said product a desired distance from the arc axis in a plane extending normally to the arc axis when the generatrix of the surface being treated is parallel to the arc axis; means for moving an arc contact spot over the surface of said anode; means for displacing said arc contact spot along the arc axis; wherein said anode includes two parallel cylinders rotated in opposition and having axes extending normally to the arc axis, a gap provided between said cylinders being smaller than a diameter of the contact plasma spot on said anode.

5. An apparatus as claimed in claim 4, wherein said cylinders are mounted on a movable support connected with a support transfer mechanism for reciprocating movement of said support along the axes of said cylinders.

6. An apparatus as claimed in claim 4, wherein said feeding device includes two similar conveyers arranged symmetrically about said arc axis.

7. An apparatus as claimed in claim 4, wherein said feeding device is disposed on a first side of the arc axis; and further comprising a water-cooled screen electrically insulated from said anode and cathode and disposed on a second side of said arc axis.

8. An apparatus as claimed in claim 5, wherein said feeding device is disposed on a first side of the arc axis; and further comprising a water-cooled screen electrically insulated from said anode and cathode and disposed on a second side of said arc axis.

9. An apparatus for high temperature treatment of rectilinear-generatrix surfaces of nonconductive products, comprising a plasma generator having an anode arranged opposite to a cathode to create therebetween an arc gap exceeding the length of a generatrix of the surface being treated, said cathode being mounted in a fixed position, and said anode being mounted integrally with said cathode to maintain a fixed position of the arc axis within said arc gap; and a product feeding device to move said product a desired distance from the arc axis in a plane extending normally to the arc axis when the generatrix of the surface being treated is parallel to the arc axis; means for moving an arc contact spot over the surface of said anode; means for displacing said arc contact spot along the arc axis; wherein said feeding device is disposed on a first side of the arc axis; and, a water-cooled screen electrically insulated from said anode and cathode and disposed on a second side of said arc axis.

10. An apparatus for high temperature treatment of rectilinear-generatrix surfaces of nonconductive products, comprising a plasma generator having an anode arranged opposite to a cathode to create therebetween an arc gap exceeding the length of a generatrix of the surface being treated, said cathode being mounted in a fixed position, and said anode being mounted integrally with said cathode to maintain a fixed position of the arc axis within said arc gap; and a product feeding device to move said product a desired distance from the arc axis in a plane extending normally to the arc axis when the generatrix of the surface being treated is parallel to the arc axis; means for moving an arc contact spot over the surface of said anode; means for displacing said arc contact spot along the arc axis; wherein said anode includes a rod coaxially arranged with said cathode and wherein said feeding device is disposed on a first side of the arc axis; and, a water-cooled screen electrically insulated from said anode and cathode and disposed on a second side of said arc axis.

11. An apparatus for high temperature treatment of rectilinear-generatrix surfaces of nonconductive products, comprising a plasma generator having an anode arranged opposite to a cathode to create therebetween an arc gap exceeding the length of a generatrix of the surface being treated, said cathode being mounted in a fixed position, and said anode being mounted integrally with said cathode to maintain a fixed position of the arc axis within said arc gap; and a product feeding device to move said product a desired distance from the arc axis in a plane extending normally to the arc axis when the generatrix of the surface being treated is parallel to the arc axis; means for moving an arc contact spot over the surface of said anode; means for displacing said arc contact spot along the arc axis; wherein said anode includes a hollow rod having an interior cavity in communication with a suction device and wherein said feeding device is disposed on a first side of the arc axis; and, a water-cooled screen electrically insulated from said anode and cathode and disposed on a second side of said arc axis.

12. An apparatus for high temperature treatment of rectilinear-generatrix surfaces of nonconductive products, comprising a plasma generator having an anode arranged opposite to a cathode to create therebetween an arc gap exceeding the length of a generatrix of the surface being treated, said cathode being mounted in a fixed position, and said anode being mounted integrally with said cathode to maintain a fixed position of the arc axis within said arc gap; and a product feeding device to move said product a desired distance from the arc axis in a plane extending normally to the arc axis when the generatrix of the surface being treated is parallel to the arc axis; means for moving an arc contact spot over the surface of said anode; means for displacing said arc contact spot along the arc axis; wherein said anode includes a rod coaxially arranged with said cathode, a pin and a nozzle concentrically arranged with said pin and through which a working gas flows towards said cathode; wherein said feeding device is disposed on a first side of the arc axis; and, a water-cooled screen electrically insulated from said anode and cathode and disposed on a second side of said arc axis.

13. An apparatus for high temperature treatment of rectilinear-generatrix surfaces of nonconductive products, comprising a plasma generator having an anode arranged opposite to a cathode to create therebetween an arc gap exceeding the length of a generatrix of the surface being treated, said cathode being mounted in a fixed position, and said anode being mounted integrally with said cathode to maintain a fixed position of the arc axis within said arc gap; and a product feeding device to move said product a desired distance from the arc axis in a plane extending normally to the arc axis when the generatrix of the surface being treated is parallel to the arc axis; means for moving an arc contact spot over the surface of said anode; means for displacing said arc contact spot along the arc axis; wherein said means for displacing the arc contact spot along the arc axis comprises suction means connected to an interior cavity of said anode, and working gas is withdrawn from said cavity of said anode by said suction device to effect axial displacement of the arc contact spot.

14. An apparatus as claimed in claim 13, wherein said means for moving said arc contact spot around the periphery of the anode comprises a solenoid concentrically arranged with the anode and creating a rotating magnetic field having its center extending around the axis of the anode.

* * * * *